(No Model.)
L. H. FOUGERES & G. W. BLAIR.
HORSE DETACHER.
No. 278,928. Patented June 5, 1883.
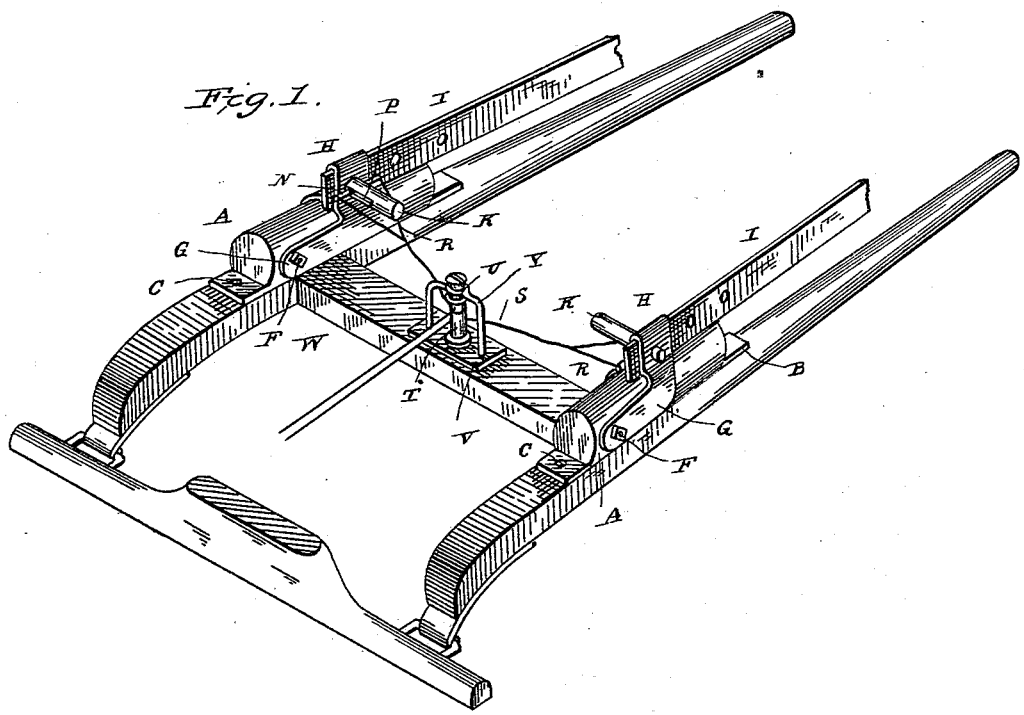
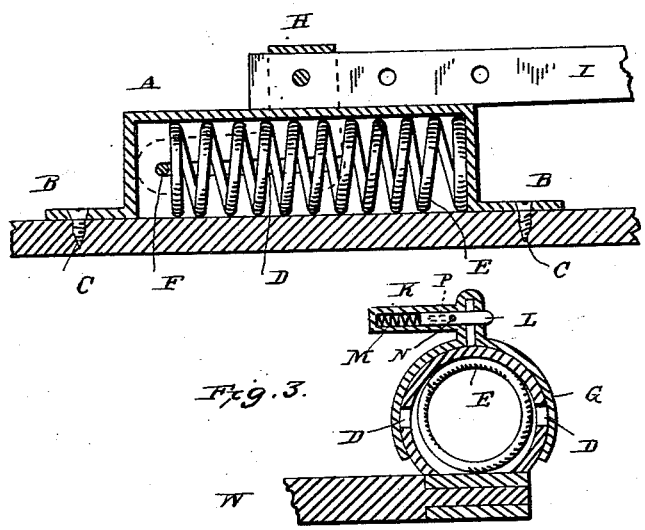
Witnesses.
Edwin L. Yewell.
H. A. Toulmin
Inventors.
Louis H. Fougeres and
George W. Blair,
E. M. Alexander.
Attorney.
N. PETERS. Photo-Lithographer, Washington, D. C.

UNITED STATES PATENT OFFICE.

LOUIS H. FOUGERES AND GEORGE W. BLAIR, OF WABASH, INDIANA.

HORSE-DETACHER.

SPECIFICATION forming part of Letters Patent No. 278,928, dated June 5, 1883.

Application filed March 31, 1883. (No model.)

*To all whom it may concern:*

Be it known that we, LOUIS H. FOUGERES and GEORGE W. BLAIR, citizens of the United States, residing at Wabash, in the county of Wabash and State of Indiana, have invented certain new and useful Improvements in Horse-Detachers, of which the following is a specification, reference being had therein to the accompanying drawings.

This invention relates to certain improvements in harness-connections for vehicles; and it has for its objects to provide means whereby the draft or strain upon the animal upon starting the vehicle will be gradual and easy; and provide for detaching the connections, so as to permit the animal to escape from the vehicle in case of accidents, as more fully hereinafter specified.

The above-mentioned objects we attain by the means illustrated in the accompanying drawings, in which—

Figure 1 represents a perspective view of the shafts of a vehicle, showing our invention applied thereto; Fig. 2, a longitudinal vertical sectional view of a portion of our improved device, and Fig. 3 a transverse sectional view of the same.

The letter A indicates a casing, constructed of metal, which is approximately cylindrical in cross-section, and is provided with flanges B at each end, having apertures through which may be passed the screws C, by means of which the casing may be secured to the shaft. The said casing is provided with diametrical longitudinal slots D, and in the interior is located a spiral spring, E, against the rear of which presses a transverse bolt, F, which passes through and is adapted to travel in the longitudinal slots in the casing. To the outer ends of the bolts are secured the ends of a semi-cylindrical frame, G, which embraces and is adapted to work longitudinally upon the casing. The said frame is constructed of metal, formed with a vertical extension, H, between the walls of which may be passed the trace-straps I. On the inside of such vertical extension is a lateral tube, K, carrying a longitudinal bolt, L, which is pressed normally outward by means of a spiral spring, M, which sits behind it. The bolt is provided with a transverse pin, N, which passes through and works in the longitudinal slots P in the lateral tubes. The said pin has attached to it the ends of a wire or metallic frame, R, to which is connected one end of a rope or chain, S, the other end of which passes around a vertical reel or drum, T, mounted on a vertical shaft, U, secured to a base, V, attached to the cross-bar W between the shafts. The upper part of the vertical shaft is supported by a frame, Y, secured to the base.

One of the devices above described is to be attached to each shaft, as shown in Fig. 1 of the drawings. The traces are provided with suitable apertures, and when the animal is hitched between the shafts are passed between the vertical walls of the extensions H, and are held therein by the bolts in the lateral tubes before mentioned. The ropes or strings connected to the metallic frames secured to the bolts extend around the drum back to the driver, so that by drawing upon them when required the bolts will be withdrawn from the traces, permitting the animal to go free.

Having thus described our invention, what we claim, and desire to secure by Letters Patent, is—

1. The combination, with the shafts of a vehicle, of the casings secured thereto and provided with longitudinal slots, the outer frames adapted to slide on said casings, and provided with bolts sitting back of spiral springs located in said casings, and the trace-holding extensions, all arranged to operate substantially in the manner specified.

2. In combination with the trace-holding extensions on the sliding frames of the casings, the lateral tubular extensions, the spring-actuated bolts and their connecting-cords, and the vertical barrel or drum around which the cords pass back to the driver, whereby the bolts may be operated to release the traces, substantially as and for the purposes specified.

In testimony whereof we affix our signatures in presence of two witnesses.

LOUIS H. FOUGERES.
GEORGE W. BLAIR.

Witnesses:
CHAS. E. SACKETT,
CHAS. F. MOORE.